Patented May 2, 1939

2,156,714

UNITED STATES PATENT OFFICE 2,156,714

METHOD OF TREATING LAMINATED GLASS

Russell G. Whittemore, Brackenridge, Pa., assignor to Pittsburgh Plate Glass Company, Allegheny County, Pa., a corporation of Pennsylvania No Drawing. Application March 26, 1937, Serial No. 133,189

2 Claims. (Cl. 49—81)

The invention relates to the treatment of a laminated glass plate which ordinarily consists of two sheets of glass secured to the opposite sides of a sheet of non-shatter plastic material, such as cellulose acetate, cellulose nitrate, or other cellulose derivatives. In laminating a product of this kind, the plate will sometimes become somewhat warped in the case of a flat plate, or will depart somewhat from the true curvature of the glass sheets in the case of a curved plate, and it is the principal object of the present invention to provide a simple inexpensive procedure whereby the laminated plates can be restored to the proper degree of flatness or curvature.

In the production of a curved laminated plate which is to be used as a windshield or the like, and employing cellulose acetate as an interlayer, the glass sheets are first bent to the desired curvature by a method, such as that set forth in the patent to Sherts and Willits Re. No. 18,918. These sheets are then assembled with a sheet of cellulose acetate therebetween and laminated by placing in a sealed rubber bag, which is in turn placed in an autoclave and exposed to heat and pressure then cooled and removed from the autoclave in accordance with the usual practice of the art. Subsequently the temperature and pressure are reduced and the assembly is removed. In some cases, the laminated plates produced by this process will show a departure in curvature from the original curvature of the glass sheets, which are left under strain, and the procedure as set forth following, serves to relieve the strain in the glass and bring the plates back to the original curvature of the glass sheets.

This result is accomplished by immersing the plate in water or other liquid having a temperature of about 212 degrees F. until the cellulose acetate plastic is softened. This ordinarily requires about one minute. The immersion is preferably performed with the straight dimension of the plate perpendicular to the ground level, so that gravity imposes no strain on the plate tending to bend it. With a windshield which has its curvature longitudinally of the plate, this will mean supporting it with its end edges perpendicular to the ground and its side edges in horizontal planes one above the other. The support of the plate may be conveniently accomplished by suspending it in a suitable wire sling. While thus supported in the water, the plate, because of the strain in the glass sheets, resumes the original curvature of such sheets, the softened plastic permitting this relatively slight readjustment of the curvature of the glass sheets. The plate is now removed from the water and allowed to cool while held in the same position as that occupied during immersion. In the case of other kinds of plastic interlayers, the procedure is the same, except as to variations in the temperature of the water, or other hot liquid, in which the plate is suspended, such temperature, and the time of treatment, depending on the character of the plastic.

In the case of a flat laminated plate which has become warped in laminating, the treatment is similar to that described in connection with the curved plate. The plate is suspended so that it lies in a vertical plane and is immersed in the heated liquid, after which it is removed and allowed to cool. The cooling is preferably accomplished while the plate is supported in a vertical plane, although in this case, it may be cooled on a flat table in a horizontal plane if desired, since with a flat plate there is no tendency to distort under the latter conditions, except as induced by a more rapid cooling of one side of the plate than the other. Any tendency to warpage may be offset by weighting the plate.

The process may also be employed to give a slight degree of curvature to a flat plate of laminated glass, when it is desired to produce a bent plate. In this case, the plate is heated as above described, and after heating so as to soften the plastic, is placed in a form or other suitable support, and bent to shape by the application of pressure which is maintained during the cooling step. Similarly, the curvature of a bent plate may be modified by heating the plate, bending to the new curvature in a form, and holding it under pressure in the form during the cooling step.

What I claim is:

1. A process of forming a laminated glass plate of desired contour which comprises forming an assembly containing a sheet of plastic material between two sheets of glass, then effecting a bond between the plastic and the glass by heating the assembly under pressure in an autoclave, cooling, releasing the pressure and removing the assembly from the autoclave, then reheating it to the temperature of softening of the plastic material, causing the assembly to assume the desired contour and finally cooling it while in bent state.

2. A process of forming a laminated plate of curved glass of desired contour which comprises forming an assembly comprising a sheet of plastic disposed between two curved sheets of glass, then bonding the plastic to the glass by application of heat and pressure in an autoclave, to form a composite body of a curvature different from that desired, subsequently reducing the temperature and pressure, removing the body from the autoclave, reheating the body to the softening point of the resin, bending the body to desired contour and cooling it while so bent.

RUSSELL G. WHITTEMORE.